United States Patent [19]

Ueno et al.

[11] 4,391,763

[45] Jul. 5, 1983

[54] PROCESS FOR THE MANUFACTURE OF HALOGEN-CONTAINING RESIN PARTICLES OF LARGER BULK DENSITY COMPRISING MIXING PARTICLES OF THE RESIN WITH INORGANIC SALTS, TREATED IN A MIXTURE IN A GASEOUS PHASE AND SEPARATING THE INORGANIC SALT FROM THE PRODUCT

[75] Inventors: Kunihiko Ueno; Akiyasu Ishii; Masazi Hukuda; Kazuyuki Nakayama, all of Iwaki, Japan

[73] Assignee: Kureha Kagaku Kogyo Kabushiki Kaisha, Tokyo, Japan

[21] Appl. No.: 223,947

[22] Filed: Jan. 12, 1981

[30] Foreign Application Priority Data

Jan. 11, 1980 [JP] Japan ............................ 55-1865

[51] Int. Cl.$^3$ ............................................ B29C 23/00
[52] U.S. Cl. ................................... 264/15; 528/488; 528/490
[58] Field of Search .................. 264/15; 528/488, 490

[56] References Cited

U.S. PATENT DOCUMENTS 4,069,291  1/1978  Kidoh et al. .................. 264/342 R
4,221,554  9/1980  Oguchi et al. ...................... 264/15

Primary Examiner—Maurice J. Welsh
Attorney, Agent, or Firm—Fleit, Jacobson & Cohn

[57] ABSTRACT

This invention relates to a compactingly processing method for the manufacture of spherical particles, having a heavier apparent specific gravity, of halogen-containing ethylene resin. In this method, 100 wt. parts of particles of the resin are mixed with 20–500 wt. parts of one or more of heat-resisting inorganic salts having particle sizes of 0.01–50μ. This mixture is subjected to a heat treatment in a gaseous phase at a temperature higher than the melting point of the resin, and then, the once added inorganic salt or salts is/are separated from the heat-treated intermediate products. In this way, the resin particles are subjected to a substantial compacting and size reduction.

3 Claims, No Drawings

PROCESS FOR THE MANUFACTURE OF HALOGEN-CONTAINING RESIN PARTICLES OF LARGER BULK DENSITY COMPRISING MIXING PARTICLES OF THE RESIN WITH INORGANIC SALTS, TREATED IN A MIXTURE IN A GASEOUS PHASE AND SEPARATING THE INORGANIC SALT FROM THE PRODUCT

BACKGROUND OF THE INVENTION

The present invention relates to improvements in and relating to a process for the preparation of spherical particles of halogen-containing ethylene resins, showing heavier values of apparent specific gravity.

Generally speaking, the halogen-containing ethylene resin shows lesser swelling ability as well as lesser solubility to the monomer, and thus, it is liable to provide rather porous resin particles of lesser specific value, when they have been prepared by the conventional suspension- or block polymerization.

With the resin particles thus prepared and of lesser specific gravity as above mentioned and as used for the supply material to melt-forming machines, not only the feed rate and thus, the extrusion rate will become correspondingly worse, but also the rate of voids formation of the shaped products therefrom by sintering will be subjected to a considerable fluctuation, thereby giving rise to the disadvantageous formation of air bubbles to a considerable degree and reducing the production efficiency to a substantial degree. As a further example when the resin is used as the material for the powder coating process, the coatings have only lesser affinity to the substrate bodies and the resulted coated layers are rather thin and frequently even pin-holed.

For converting these apparently lighter, halogen-containing resin particles into those having heavier specific gravity, it has already been proposed to process the former in such a way that these defective porous resin particles are dispersed in an aqueous phase and then heated in an autoclave in the presence of an inorganic suspension protector agent up to a higher temperature near the melting point of the resin (for instance, refer to Japanese Open Patent Specification Sho-51-150569).

This proposed conversion or improving process is rather superior from such a view point that the desired spherical and heavier resin particles can be provided at a rather high yield and lesser production cost, when comparing with still more conventional processes wherein resin monomer is after-polymerized with the porous resin particles during the polymerization step; the porous resin particles are baked by contact with a stream of high temperature gaseous medium; or they are melt-pelletized and then subjected to a freeze pulverization step.

However, we have experienced that the above proposed process represents such a defect that it must necessarily use a pressure vessel by virtue of the very use of water as dispersant. In addition, in this case, the autoclave or pressure vessel must be made of such higher grade as for avoiding excessive thermal distorsion as liably to be met during the resin particle-refining process. In addition to this defect, giving rise to a substantial shortening of durable life of the pressure vessel, rapid heating and cooling must preferably be avoided for extending the effective life thereof. Therefore, the vessel material must be selected carefully and specifically from high cost, high grade, high tension steels, thus representing a substantial defect. By virtue of the requisite use of water as dispersant for the formation of the aqueous phase to be employed and since the water represents a large heat capacity appearing each time for dispersion, suspension, heating, cooling and discharging of the resin material and thus requiring a long processing period and too many processing steps which mean a substantial processing defect, especially when considering the whole process from an economical point of view. This defect will be further accentuated by virtue of the batch processing mode of the process which must be necessarily be employed for the aimed purpose.

SUMMARY OF THE INVENTION

In consideration of our prior art knowledge above referred to, a main object of the present invention is to provide such an improved process which may well obviate the aforementioned several conventional defects inherent in the known processing modes.

A further object of the present invention is to provide an improved process in which the water as dispersant must not be introduced in the manufacturing process.

Still a further object of the present invention is to provide a process for the manufacture of spherical particles of halogen-containing ethylene resin, having heavier specific gravity, in a shorter as possible time period.

A basic inventive idea for the fulfilment of the foregoing objects resides in a process for the manufacture of spherical particles, having a heavier apparent specific gravity, of halogen-containing ethylene resin, said process characterizingly comprising in combination of a step of mixing 100 wt. parts of particles of the said resin with 20–500 wt. parts of one or more heat-resisting inorganic salt having particle sizes of 0.01–50$\mu$; a step for heat-treating said mixture in a gaseous phase at a temperature higher than melting point of the said resin; and a further step for separating said inorganic salt or salts from the heat-treated intermediate products.

At this stage of the description, it should be stressly noted that, generally speaking, the heat-treatment of porous particles of the halogen-containing ethylene resin only in a gaseous phase at a temperature above the melting point of the resin will result in a sintering of the respective resin particles, indeed, within a short time period so that the apparent specific gravity of these particles may become higher. In this case, however, these particles will soon coagulate with each other into blocks, thereby providing irregular shapes other than the desired spherical form. It is, therefore, practically impossible as a result to produce spherically shaped, apparently heavier particles at a high yield as desired. In fact, indeed, the yield will lower as low as 20–30%. Thus, it will be clear that this processing mode can not be adopted for the industrial purpose.

In order to solve this problem, we have made numerous and profound experiments and found that when finely divided particles of heat-resisting inorganic salt or salts are mixed with the porous particles of the halogen-containing ethylene resin and then the mixture is subjected to a heating step in a gaseous phase at a temperature above the melting point of the resin for a short time period, the desired spherical particles thereof without inviting any coagulation and of higher apparent specific gravity can be easily prepared, as was briefly mentioned hereinbefore.

In the following, the inventive process will be set forth hereinbelow in a more detailed and specific way.

It should be noted that usable porous particles of halogen-containing ethylene resin may be those of fluororesin such as vinylidene fluoride, vinyl fluoride, chlorotrifluoroethylene, trifluoroethylene, tetrafluoroethylene or the like; vinyl chloride resin; vinylidene chloride resin; vinyl bromide resin or the like; respective polymer(s) and/or copolymer(s) thereof. These porous particle of each of these resins can be prepared by the suspension polymerization or the block polymerization technique and have preferably particle sizes of 30–500μ. Each of these resins may occasionally and conventionally contain a small amount of conventionally known plasticizer(s) and/or stabilizer(s).

As the heat-resisting inorganic salt(s), any of those which are in the form of stable finely divided particles and incapable of melting, evaporating, sublimating or chemically reacting at a certain heat treatment temperature higher than the melting point of the halogen-containing ethylene resin. As an example thereof, oxides, halides, carbonates, borates, sulfates, phosphates of alkali- or alkali earth metal; hydrooxides of alkali earth metal, and/or the like, may be raised. Especially those inorganic salts which are soluble in acid or water, lower in its price and incapable of injuring the thermal stability of the halogen-containing ethylene resin even during the high temperature heat treatment as employed in the inventive process are highly preferable for the purpose of the present invention. Among others, KCl; NaCl; $CaCO_3$; $Ca(OH)_2$; $CaSO_4$ and sodium polyphosphate may be used.

The role of any of these salts is such that it adheres onto the surface of each of resin particles during the heat-treating stage of gaseous phase as above mentioned, and for effectively preventing otherwise possible mutual coagulation of the resin particles which are naturally heated up to its softened state, as well as for preventing excess and direct heating of the resin particles which are subjected to an indirect heating through the intermediary of the highly heated inorganic salt(s) acting at this stage as a kind of protector for the resin. In this way, otherwise invited overheating of the resin particles can be effectively avoided and the thermal stability thereof will not be injured in any way. For this purpose, thus the particle sizes of the inorganic salt(s) are selected to be 0.01–50μ, more preferably 0.05–20μ.

With larger particle sizes of the inorganic salt(s) than 50μ, it is difficult to cause the salt(s) to intimately attach onto the resin particles, resulting in only a poor effect in the prevention of resin coagulation. On the contrary, when finer salt particles than 0.01μ are used, the required amount thereof will become unacceptably large so that the economical merits will be lost.

The range of usable amounts of the heat-resisting inorganic salt(s) may be 20–500 wt. parts relative to 100 wt. parts of halogen-containing ethylene resin particles. With lesser amount of the salt particles, the aimed coagulation-preventing effect will be unacceptably small, resulting in substantial production of resin particles of smaller specific gravity. In addition, disadvantageous deposits of resin particles on the inside wall surfaces of the heat-treating apparatus utilized for the aimed purpose will become apparent and substantial, thereby reducing considerably the production yield. On the contrary, if a larger amount of inorganic salt particles than above specified be used, its effect can not be so much increased and in addition, the aimed reseparation thereof from the resin would become substantially difficult. Thus, such disadvantageous processing mode must be discarded.

For the execution of the heat-treatment, the halogen-containing ethylene resin particles are preparatorily mixed with the inorganic salt and subjected to heat treatment in gaseous phase and at a temperature higher than the melting point of the resin.

The heat-treating apparatus adapted for carrying out the inventive process does operate without use of any aqueous medium, and thus, it may be of the open type. As an example, a heater provided with agitating means; a fluidized bed type vessel operating with headed air streams; a kind of rotary kiln or the like, may be effectively utilized. Among others, however, we rather prefer to use the rotary kiln type machine which can rather easily operate as a continuous heat treating apparatus.

As the machine constituents material adapted for being used for the desired purpose, any heat-resisting material, such as metals, and among others, iron and/or copper may preferably be adopted.

Since the inventive processes in an inert gaseous medium such as nitrogen, air or the like, without use of any aqueous medium, necessary heating and cooling steps can be realized in a short period.

As was referred to hereinbefore, the heat-treatment is carried out at a temperature higher than the melting point of the resin. The higher the operating temperature is, it will naturally bring the desired effect in correspondingly shorter periods. With too much higher operating temperatures, however, the thermal stability of the resin could be injured. On the contrary, and at lower temperatures than the melting point of the melting point, the sintering speed of resin particles will become unacceptable low so that it is difficult to produce the desired substantially true-spherical resin particles of higher specific gravity within short operation period.

Generally speaking, the heat-treating time in the inventive process will amount to from about 30 seconds to 60 minutes, preferably 1–10 minutes. In this way, spherical particles of halogen-containing ethylene resin, of heavier apparent specific gravity can be successfully prepared. However, under occasional demands, these particles will be utilized only upon execution of sintering or other thermal treatment for the purpose of realization of inter-particle melting. For this purpose, of the inorganic salt(s) deposits must be removed from the spherical resin particles preferably through the way of water- or acid wash. In this way, the desired separation can be realized in an easy way. The spherical particles obtained in the process of the invention represent a substantially higher specific gravity which shows generally an increase of 10–40 g/dl in comparison with that of the porous resin. Each of these particles has been subjected to an intense compacting and becomes rather transparent. The spherical particle shape is almost complete and ideal.

The thus prepared spherical resin particles show, therefore, substantial prevention of conventionally encountered hopper drop during the thermo-extrusion process, thereby increasing the real feed rate or catch in and by the extrusion die. In this way, the extrusion efficiency can be substantially improved. Therefore, the products according to this invention can be utilized successfully and optimally as various materials for the manufacture of sign pen proper; electrolytic membrane (upon sintering), as an example. As a further important material, these products can be effectively utilized as powder paint material, so as to provide non-pin-holed coatings of suitably selected thickness.

In the following, several numerical examples will be given for more specific description of the invention.

EXAMPLES 1-3

In a blender, having a real volumetric capacity: 300 lit., 8 kgs of dry powder of polyvinylidene fluoride suspension polymerized resin, having various properties shown in Table 1, a specifically selected amount of calcium carbonate, mean particle size: $0.5\mu$, were charged and blended together.

Then, the mixture was supplied to a rotary kiln type heat treating machine, stainless steel-made. 100 mm$\phi \times$ 2,000 mm, kept at a predetermined elevated temperature, at a feed rate of 16 kg/hr in Examples 1 and 2; 24 kg/hr in Example 3, respectively, so as to be subjected to a heat treatment in air atmosphere. The machine rotational speed was 8 r.p.m. in Examples 1 and 2; and 15 r.p.m. in Example 3, respectively. The staying period was selected to be 9 minutes in the mean.

Then, the thus heat-treated mixture was transferred to an inorganic salt dissolving vessel, of 8-lit.-capacity, for removal of calcium carbonate fine particles covering the resin particles or deposited thereon by being subjected to a diluted acid wash, by introducing 20 kgs of hydrochloric acid and 200 kgs of water, so as to produce an acidic water of pH 2.0. Then, the washed resin particles were taken out, washed with water, dehydrated and dried up.

The apparent or bulk specific gravity of the resin particles could be regulated as desired by adjusting the heat treating temperature, as is apparent from Table 1. When examined visually, it was found that there were none of aggromerated larger resin particles or larger masses. The particle sizes were reduced than before and by the very thermal sintering and the peak or mean particle size was shifted by contraction to substantially lesser value.

Comparative Experiment 1

In a stainless steel-made autoclave, of 60-lit. capacity, fitted with an agitator, 8 kg of polyvinylidene fluoride which is same as was used in Example 1; 24 kg of water, 11.2 kg of potassium oleate; 0.4 kg of calcium hydroxyapatite, manufactured and sold by Nippon Kagakusha, under the trade name of "Supertight-10" and 6.24 g of calcium sulfate, were charged, mixed thoroughly and then the autoclave was closed. Then, steam was blown at 10 kg/cm$^2$, G into the autoclave, so as to elevate gradually the temperature of the mixed charge in liquid phase for 120 minutes until the temperature arrived at 170 deg. C. After arrival of this specific temperature, cold water was recirculated through the jacket of the autoclave until the inside temperature lowered to 45 deg. C. Finally, the calcium hydroxyapatite was separated by addition of hydrochloric acid.

Physical properties of the thus obtained product particles are shown in Table 1. In this case, aggromerated larger particles and mass products could not found.

It will naturally be seen that for the execution of the process mode according to this Comparative Experiment 1, use of the autoclave can not be avoided. Sudden and profound heating and/or cooling must naturally be avoided for the protection and elongated durable life of the autoclave. As an example, 120 minutes or so longer operational period must be consumed for elevating the autoclave temperature to 170 deg. C. 60 minutes or so must be consumed for lowering the temperature to 45 deg. C. Thus, a considerably longer operational period is needed in comparison with the inventive Examples 1-3.

TABLE 1

| | Example | | | Comparative experiment |
|---|---|---|---|---|
| | 1 | 2 | 3 | 1 |
| heat treating temperature, °C. | 180 | 200 | 250 | 170 |
| inorganic salt/ (CaCO$_3$) polyvinylidene chloride (wt./wt.) | 1/1 | 1/1 | 2/1 | |
| particle size distribution | | | | |
| before heat treatment | | | | |
| 80 mesh-on, % | 0.95 | | | |
| 100 mesh-on, % | 3.76 | 1.0 | | |
| 150 mesh-on, % | 36.25 | 4.7 | 4.4 | 2.8 | 4.2 |
| 200 mesh-on, % | 33.05 | 26.2 | 26.0 | 26.7 | 27.7 |
| 250 mesh-on, % | 8.76 | 23.5 | 14.8 | 10.0 | 11.4 |
| 325 mesh-on, % | 14.45 | 31.2 | 40.4 | 44.8 | 40.1 |
| 325 mesh-pass | 2.78 | 13.4 | 14.4 | 15.7 | 16.6 |
| bulk specific gravity (g/dl) | 35 | 71.3 | 73.2 | 75.9 | 70.9 |

EXAMPLE 4

8 kgs of the vinylidene fluoride suspension polymer which is same as used in Example 1 were mixed together with 24 kgs of sodium chloride, mean particle size: 40 $\mu$, in the same apparatus as in Example 1, and heat-treated at 190 deg. C. for 9 minutes of mean staying time. With purified water by ion exchange technique, the thus resulted mixture was washed for the removal of the added sodium chloride.

The apparent or bulk specific gravity of the thus prepared spherical vinylidene fluoride polymer particles amounted to 62.0 g/dl, showing no existence of agglomatically formed larger size particles and/or massy products. The particle size distribution was as follows:

| mesh-on | 80 | 100 | 150 | 200 | 250 | 325 | 325 mesh-pass |
|---|---|---|---|---|---|---|---|
| % | — | — | 3.5 | 29.0 | 17.0 | 39.3 | 11.2 |

EXAMPLE 5

Dried-up powder, 200 g, of vinylidene fluroride suspension polymer as was used in Example 1, was blended with 300 g of calcium hydroxide, mean particle size being $5\mu$. Then, the blended mixture was transferred to a heat-treating vessel, 40 cm $\times$ 40 cm $\times$ 5 cm (height), kept at 220 deg. C. and subjected to a heat treatment for 5 minutes, while it was agitated evenly and thoroughly.

Finally, the thus heat-treated particle mixture was transferred to a decomposing vessel to which a diluted hydrochloric acid was added so as to separate the covering or mixed calcium hydroxide by dissolution. The thus prepared products were then subjected to waterwashing, dehydrating and drying steps.

The bulk specific gravity of the thus provided particles amounted to 72 g/dl, yet maintaining its spherical configuration. All these spherical particles became transparent, accompanying almost none of agglomerated larger particles and massy byproducts.

EXAMPLE 6

In place of vinylidene fluoride as used in Example 1, suspension-copolymerized, vinylidene fluoride-vinyl fluoride copolymer, polymerization ratio being 95:5, mean particle size: 80μ; bulk specific gravity: 33 g/dl, was used in the quantity of 8 kgs powder, and mixed with 8 kgs of calcium carbonate, of mean particle size of 0.5μ. Then, the mixture was subjected to same heat-treatment in the same apparatus as set forth in Example 1 and at 200 deg. C. and discharged and after-treated.

The thus processed vinylidene fluoride-vinylfluoride copolymer showed its apparent specific gravity: 70.7 g/dl, showing practically no sign of agglomerated larger size particles and massy byproducts. The particle size distribution of the processed particles showed the following data:

| mesh-on | 150 | 200 | 250 | 325 | 325 mesh-pass |
|---|---|---|---|---|---|
| % | 4.2 | 30.3 | 11.4 | 41.1 | 13 |

EXAMPLE 7

In place of vinylidene fluoride used in Example 1, suspension copolymerized polyvinyl chloride, 8 kgs, in dried powder state, was added with calcium carbonate, 16 kgs, the mean particle size being 0.5μ, in a blender, the capacity being 300 lit.

The thus blended mixture was fed continuously at a rate of 24 kgs/hr to a rotary kiln type heat-treating apparatus same as that which was utilized in Example 1 and kept at 160 deg. C. In this way, the mixture was heat-treated at a duration period: 9 minutes, and then discharged in a discharge tank, of 2,000 lit.-capacity, disposed at the discharge outlet of the heat-treating apparatus made of P.V.C.

To this tank, 40 kgs of 35%-hydrochloric acid and 400 kgs of industrial water were added, so as to resolvingly separate the inorganic salt once added to. Finally, water wash, dehydration and drying were executed.

The thus processed particles showed physical properties as shown in the following Table 2. As will be acknowledged therefrom, a substantial high density concentration effect was realized. There was no sign of agglomerated larger size particles and massive by-products.

TABLE 2

| | Example 7 |
|---|---|
| heat treating temperature, °C. | 160° C. |
| inorganic salt/ (CaCO₃) vinyl chloride (wt./wt.) | 2/1 |
| particle size distribution | before heat treatment |
| 60 mesh-on, % | 2.4    3.0 |
| 80 mesh-on, % | 42.2    33.0 |
| 100 mesh-on, % | 36.0    28.8 |
| 150 mesh-on, % | 18.4    31.4 |
| 200 mesh-on, % | 1.0    3.4 |
| 250 mesh-on, % | 0    0 |
| 325 mesh-on, % | 0    0 |
| 325 mesh-pass | 0    0 |
| bulk specific gravity, g/dl | 50.0    60.2 |

The embodiments of the invention in which an exclusive property or privilege is claimed are as follows:

1. A process for the manufacture of spherical particles, having a heavier bulk specific gravity, of halogen-containing ethylene resin prepared from at least one monomer selected from vinylidene fluoride, vinyl fluoride, chlorotrifluoroethylene, trifluoroethylene, tetrafluoroethylene, vinylchloride, vinylidene chloride and vinyl bromide, said process comprising in combination of; a step of mixing 100 wt. parts of particles of the said resin with 20–500 wt. parts of one or more of the heat-resisting inorganic salts having particle sizes of 0.01–50 , which are in the form of stable particles at a temperature higher than the melting point of said halogen-containing ethylene resin; a step for heat-treating said mixture in a gaseous phase at a temperature higher than melting point of the said resin; and a further step for separating said inorganic salt or salts from the heat-treated intermediate products.

2. The process of claim 1, wherein the halogen-containing ethylene resin is vinylidene fluoride resin.

3. The process of claim 1, wherein the halogen-containing ethylene resin is vinyl chloride resin.

* * * * *